Nov. 6, 1945.                H. M. WISE                2,388,303
                      ELASTIC MEASURING SCALE
                        Filed Jan. 30, 1943
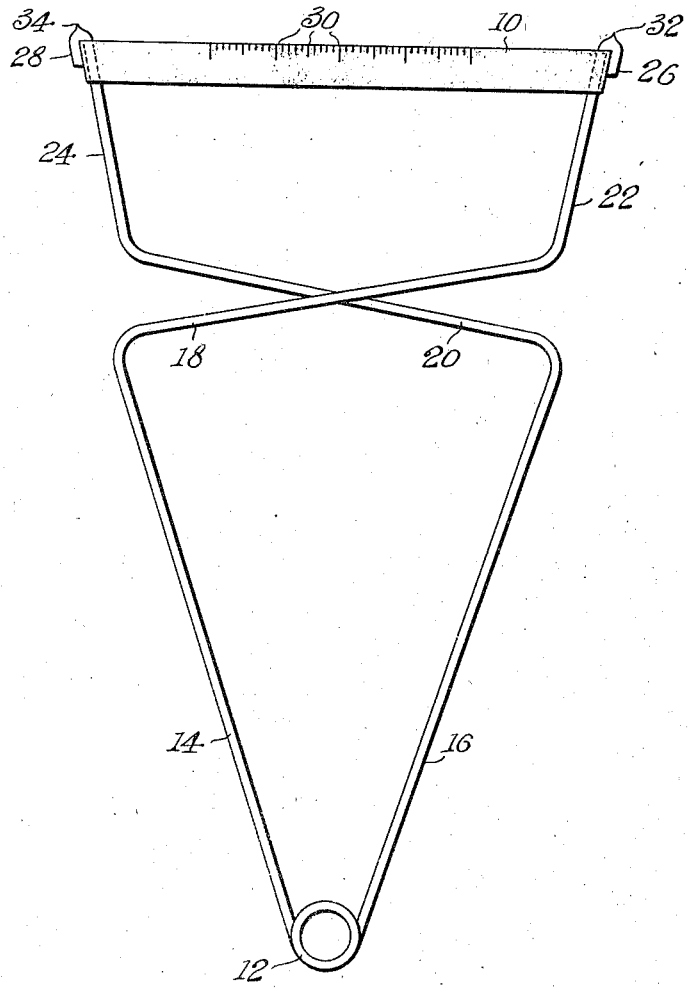
Inventor
Henry M. Wise

UNITED STATES PATENT OFFICE 2,388,303

ELASTIC MEASURING SCALE

Henry M. Wise, Jacksonville, Fla.

Application January 30, 1943, Serial No. 474,192

3 Claims. (Cl. 33—137)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to elastic measuring devices whereby intervals of variable lengths may be subdivided into a desired number of equal parts, and more particularly to an improved holder for the elastic measuring scale.

It is an object of this invention to provide a device of the character described which will be simple to operate and which will comprise the minimum number of parts.

It is a further object of this invention to provide an instrument of this type which will be simple and inexpensive to construct and in which maintenance requirements are practically eliminated.

These and other objects and advantages of the invention will become apparent upon a consideration of the following detailed description when taken in conjunction with the accompanying drawing in which an embodiment of the invention is illustrated.

In the preparation of topographical maps on which elevation is shown by contour lines, the positions of the lines are determined by locating representative points of known elevation and assuming that the grade between these points is uniform. It will be clear that the number of such points necessitated will vary in accordance with the terrain to be depicted. That is, over uniform grades a few points will be sufficient while over undulating grades a greater number will be required. Since only horizontal distances appear in scale on maps of this type it is clear that a steep grade will require a greater number of contour lines per unit of horizontal distance to indicate a given vertical rise than will be required to indicate a gradual slope.

As an illustrative example, assume that there are two places on the map of equal differences in elevation the vertical interval of which requires eight contour lines to represent. Also assume that their relative grades are such that the horizontal distance which must be traversed in one case while rising such interval will be twice that traversed while rising the same interval in the other. Under these conditions it is apparent that the spacing of the contour lines illustrating the greater slope will be half as great as the spacing of the contour lines representing the smaller slope. To insure equal spacing of the contour lines under these conditions it has been necessary to provide a plurality of fixed scales or to determine the proper spacing by geometric construction. Since in numerous cases the spacing between the known points will not fit any of the available fixed scales, recourse must be had to geometric construction with its attendant delays.

In order to eliminate the time thus lost, and to do away with the necessity for having at hand a multiplicity of instruments, I have provided the device illustrated in the drawing. Referring to the drawing, wherein the sole figure represents an elevation, it will be seen that the body of my device comprises a single piece of flexible material bent to form a carrier for the elastic tape 10.

The body member is preferably formed in the following manner. A strip of form-retaining, substantially resilient material is wound spirally at its center for one or two turns to form a coil spring 12. The ends are then bent in the form of a V to provide divergent operating arms 14 and 16 which are connected by a resilient apex portion, the latter being constituted by the coil spring 12. At a distance from the spring section 12 somewhat greater than the average hand width, the arm 14 is bent inwardly to form the cross-piece 18, and the arm 16 bent inwardly to form the cross-piece 20. At a point substantially over the upper bends in the arms 14 and 16 the cross-pieces 18 and 20 are bent upwardly to form the supporting arms 22 and 24, respectively. At a point at a sufficient height above the lower bend of the supporting arms 22 and 24 to allow the tape 10 to be clear of the cross-pieces 18 and 20 when the arms 22 and 24 are at their extreme outward position, the ends of the flexible member are turned back upon themselves to form clamping sections 26 and 28, respectively, for holding the tape 10 in position.

The tape 10 may be composed of any suitable material such as a rubber band, elastic tape, or the like. Equally spaced divisions 30, forming a suitable scale, are marked off along the outer edge of the tape. The clamping sections 26 and 28 may be provided with sharpened points 32 and 34, respectively, in order that the desired spacing of the divisions 30 on the tape 10 may be more easily maintained.

From the construction described above, it will be seen that the spring 12 will normally bias the supporting arms 22 and 24 outwardly a degree sufficient to keep the tape 10 taut. When the operating arms 14 and 16 are grasped and moved inwardly, the cross-pieces 18 and 20, respectively, cause an outward movement of the supporting arms 22 and 24 against the action of the tape 10, This outward movement of the clamping sections 26 and 28 will cause the tape 10 to stretch and consequently cause a uniform increase in the separation of the divisions 30.

In use, the vertical distance between two points on the map is determined and the number of contour lines to represent such distance calculated. The instrument is then grasped by the divergent operating arms 14 and 16 and the points 32 and 34 placed outside of, but on a line with, the two points in question so that the scale is approximately centered therebetween. The operating arms 14 and 16 are then drawn inwardly until the requisite number of the divisions 30 separate the chosen points on the map. The points 32 and 34 of the instrument are then driven into the drawing board to maintain the tape 10 in its properly stretched position while marking off corresponding divisions on the map. From these points the contour lines may then be sketched in by the customary procedure.

While I have described a body-formed coil spring to maintain the arms in separation, it is apparent that any suitable means may be used for this purpose without departing from the spirit of the invention.

Similarly, while I have applied my device particularly to a contour determining means, it is clear that it is equally adaptable for use to proportion the distance or the equal spacing of any area within its range into the required number of spaces desired.

Accordingly, it is not my desire to be limited to the particular arrangements and embodiments described but to include the various modifications within the spirit of the invention which will suggest themselves to those skilled in the art.

Having thus described my invention, what I claim as new and wish to secure by Letters Patent is:

1. A holder for elastic measuring scales comprising a pair of spaced operating arms, a pair of spaced scale-supporting arms adapted to support an elastic measuring scale therebetween, cross-members connected between each of said scale-supporting arms and its opposite operating arm, and resilient means arranged to influence said scale-supporting arms outwardly, said operating arms being movable together to separate said scale-supporting arms to thereby elongate the elastic measuring scale.

2. A one-piece holder for elastic measuring scales comprising a form-retaining, substantially resilient strip formed to provide divergent operating arms connected by a resilient apex portion, said divergent arms being connected to intermediate cross-members terminating in spaced scale-supporting arms adapted to support an elastic measuring scale therebetween, said divergent operating arms being movable together to separate said spaced scale-supporting arms to thereby elongate the elastic measuring scale.

3. A one-piece holder for elastic measuring scales comprising a form-retaining, substantially resilient strip formed to provide divergent operating arms connected by a resilient apex portion, said divergent arms being connected to intermediate cross-members terminating in spaced divergently extending scale-supporting arms adapted to support an elastic measuring scale therebetween, the free ends of said scale-supporting arms being formed with means for embracing the outer edge of said elastic measuring scale, said divergent operating arms being movable together to separate said spaced scale-supporting arms to thereby elongate the elastic measuring scale.

HENRY M. WISE.